United States Patent [19]

Roxby

[11] 4,176,818
[45] Dec. 4, 1979

[54] LOAD-LIFTING AND CENTERING DEVICE

[76] Inventor: Edwin H. Roxby, 11428 Connecticut Ave., Kensington, Md. 20795

[21] Appl. No.: 885,414

[22] Filed: Mar. 10, 1978

[51] Int. Cl.² ............................................... B60P 1/64
[52] U.S. Cl. .............................. 248/354 H; 248/354 S; 248/357; 414/498
[58] Field of Search ................... 214/515; 248/354 H, 248/354 S, 357, 359, 351, 317; 211/188, 194; 108/53.5

[56] References Cited

U.S. PATENT DOCUMENTS

| | | | |
|---|---|---|---|
| 1,425,965 | 8/1922 | Hocke | 214/515 |
| 3,757,976 | 9/1973 | Lely | 214/515 |

*Primary Examiner*—Albert J. Makay
*Attorney, Agent, or Firm*—James H. Laughlin, Jr.

[57] ABSTRACT

A load-lifting and centering device is given whereby a load device in the form of a rack supported by legs is capable of self-centering during a lifting procedure whereby the same is centered laterally, longitudinally, and in a level position, and finally locking into place so that the portable rack and load are firmly connected to a vehicle while in transit.

10 Claims, 7 Drawing Figures

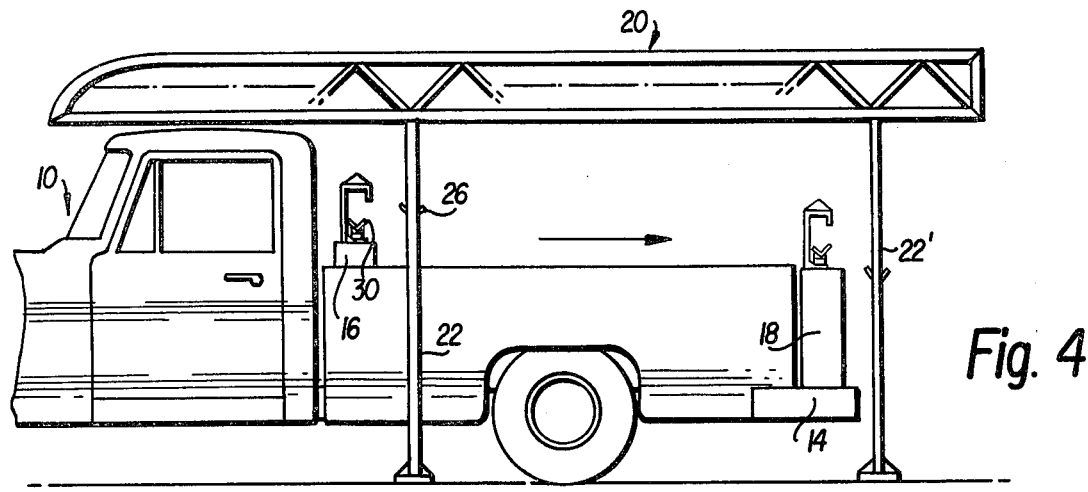
Fig. 4
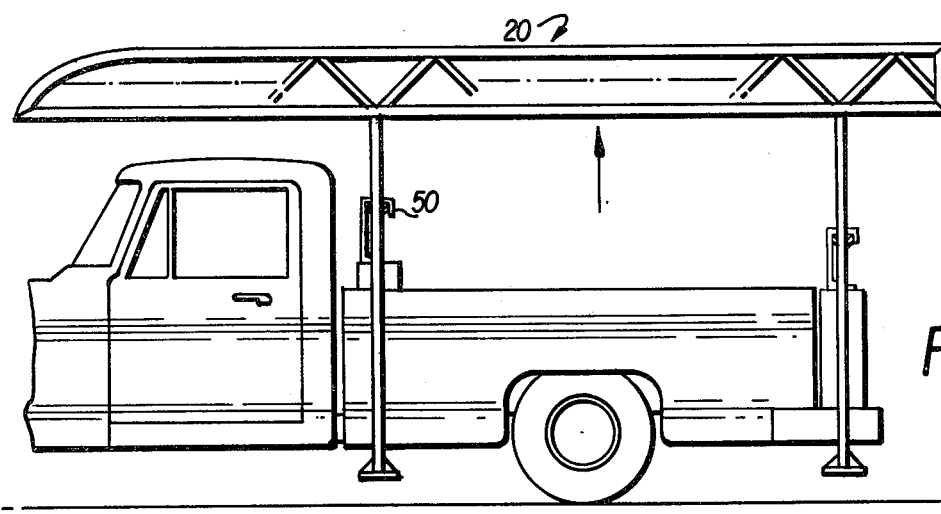
Fig. 5
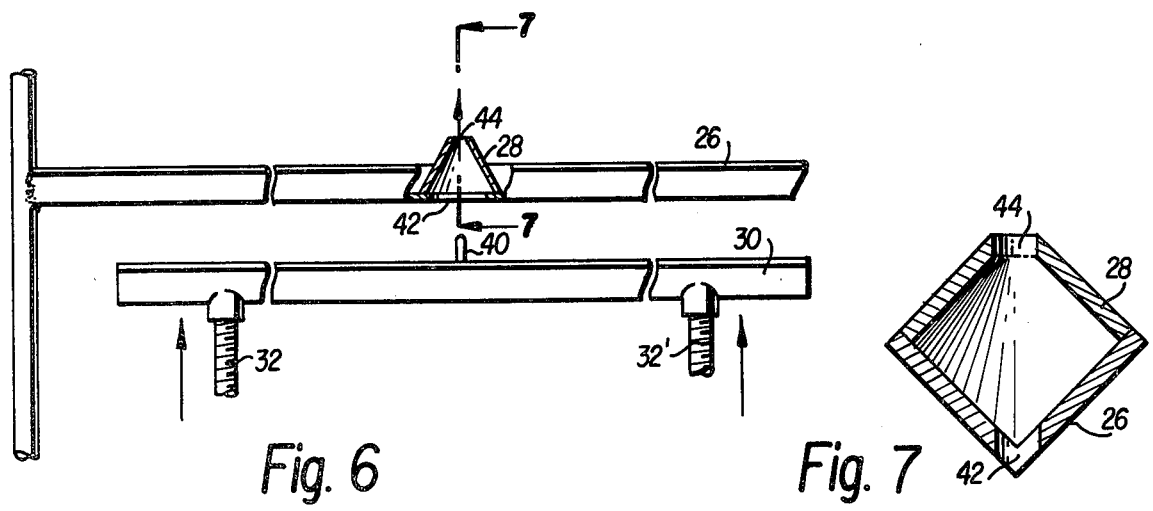
Fig. 6
Fig. 7

LOAD-LIFTING AND CENTERING DEVICE

This invention relates to portable containers and more particularly it relates to containers which are readily moved from place to place by means of a vehicle, such as a truck, tractor, or tractor-trailer combination, especially adapted for use with containers and racks. This invention additionally relates to the combination of such specially adapted trucks and rack or container assemblies. This invention further relates to a method for handling transportable rack assemblies and containers.

In the transporting of commercial goods or construction materials to various locations and the loading and unloading of such goods and materials, it is often necessary in many industries to use large trucks or trailer-tractor combinations which tie up the load for hours or even days while the same is loaded or unloaded. It can readily be seen that this means that a complete truck is generally inactivated for long periods of time and that it cannot be used for other operations, idling not only equipment but labor inefficiently.

In the recreation or leisure time field, vehicles having light hauling equipment, racks, campers, camping assemblies, and other devices are often desirably used with lightweight trucks. It is frequently necessary to load an unload such racks, equipment, and devices from time to time so that the vehicle can be used for other purposes.

It is an object of this invention to provide apparatus for transporting goods and materials, the use of which apparatus will avoid the idling of the vehicle while the container is being loaded and unloaded. It is another object of this invention to provide transportable containers and racks for goods and materials, the use of which can potentially reduce operating expense. It is yet a further object of this invention to provide for a load-lifting device which permits convenient and efficient substitution of one container or load for another container or load without undue delays in time and with absolute safety, not only during the exchange period but also during equipment operation. It is yet a further object of this invention to provide a system which is capable of mounting interchangeably a number of different loads without modification of the vehicle for such different loads. Other objects and advantages will become apparent from a reading of the ensuing specification.

These and other objects of this invention are attained by the provision of a container or rack assembly which is readily loaded and unloaded from a truck bed or frame or specially designed trailer. By this invention a single truck or trailer can be used for the handling of many different loads, frames, racks, campers, and other equipment as may be desired.

The objects of this invention are attained by employing a mechanism for mounting and dismounting overhead carrying racks or other containers on vehicles such as, for example, pickup trucks for the transportation of contractors' tools or supplies, campers' equipment, boats, and other equipment which is known to be transportable by such devices. The rack or container itself can be of any conventional type and may be the commonly observed type of the welded bridge work which extends over the whole truck body including bed and cab, and may extend from bumper to bumper. Such devices can be built in numerous configurations. Alternatively, a container which either matches exactly the truck frame, bed, or other convenient support configuration of the vehicle can be employed.

One embodiment of this invention involves the use of metal structure on a plurality of legs, a self-centering device for the rack during the lifting procedure so that the rack or container in place is centered laterally, longitudinally, and in a level position with respect to the vehicle supporting the structure and being further characterized in having a locking device such that the portable or interchangeable rack or load can be firmly connected to the vehicle while in transit. As will become obvious from a further reading of the ensuing specification, the same mechanism in a reversing configuration can be employed to unlock and safely lower the rack or container to the ground or to a storage mechanism, thus releasing the vehicle from the container or load.

There has been considerable interest in the area of vehicular truck container mounting, removal, and storage as evidenced by U.S. Pat. Nos. 2,808,289 issued to Scoby; 2,847,137 issued to Stringfellow; 2,958,538 issued to Norris et al; 3,119,503 issued to Herpich et al; 3,211,313 issued to Katz; 3,231,121 issued to Powell; 3,255,906 issued to Proler et al; 3,332,661 issued to Hand; 3,362,552 issued to Thiele; 3,520,433 issued to Blackburn; 3,521,773 issued to Geister; and 3,710,966 issued to Vaitys, and many magazine and other publications.

This invention differs from the prior art because of the ease and simplicity of the connections employed and the safety mechanisms which are contained herein.

The above objects and others are attained in this invention by the provision of a container which is readily loaded and unloaded from a truck or specially designed vehicle device so that the same can be used for handling many such racks or containers.

For a better understanding of this invention, reference is made to the accompanying drawings wherein FIG. 1 is a prospective view of a lightweight vehicle having lifting assemblies attached thereto;

FIG. 4 is a side view of the vehicle approaching a load rack preparatory to engagement;

FIG. 5 is a side view after engagement, lifting and locking have taken place;

FIG. 6 is a detailed showing of the inner construction between the load-lifting and the load-centering embodiments of this invention; and FIG. 7 is a further detailed showing of the load-centering embodiment of this invention shown as a side view from that depicted in FIG. 6.

Throughout the drawings and in the ensuing description the same reference numbers are commonly employed to describe the various portions and features of this invention from figure to figure in order to provide a more clear understanding of the invention, its parts, and the interrelationships.

Figure 1:
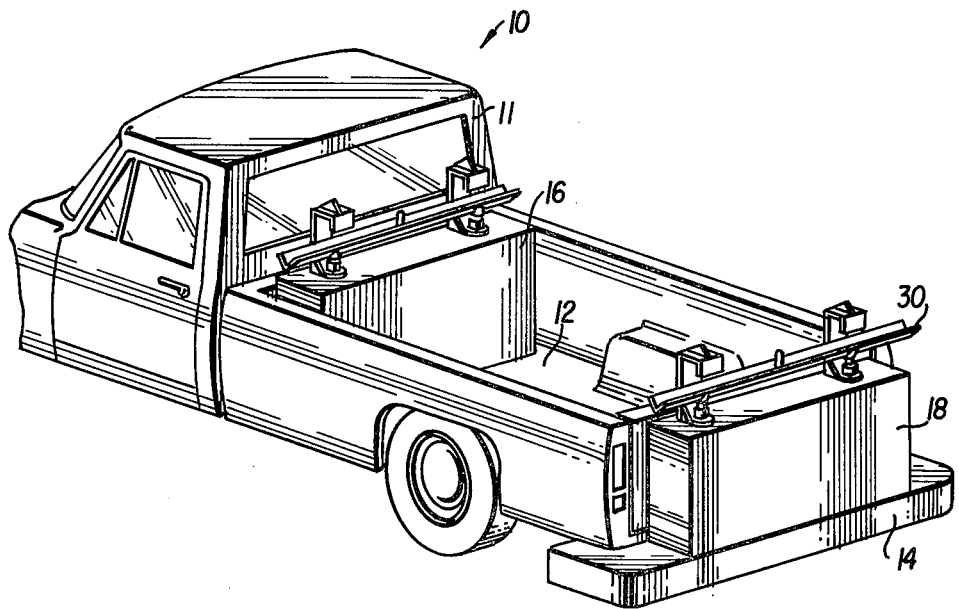

Referring now to FIG. 1, vehicle 10 of any type such as, for example, a lightweight truck sometimes known conventionally as a pickup truck, has two jacks or load-lifting devices 16 and 18 substantially permanently attached thereto. The first, a forward jack 16, is located behind the cab 11 or at some other convenient location having adequate support for the load which it is to carry. The rear jack 18 which may be optional is shown located over the bumper 14 but can be fixed over any convenient support in the vehicle. The structure and design of both the forward jack 16 and the rear jack 18 are substantially the same and will be described later. Where the rear jack is located on the bumper surface 14, it may be desirable to provide additional support in that area in order to insure for the safety that this invention contemplates.

Figure 2:
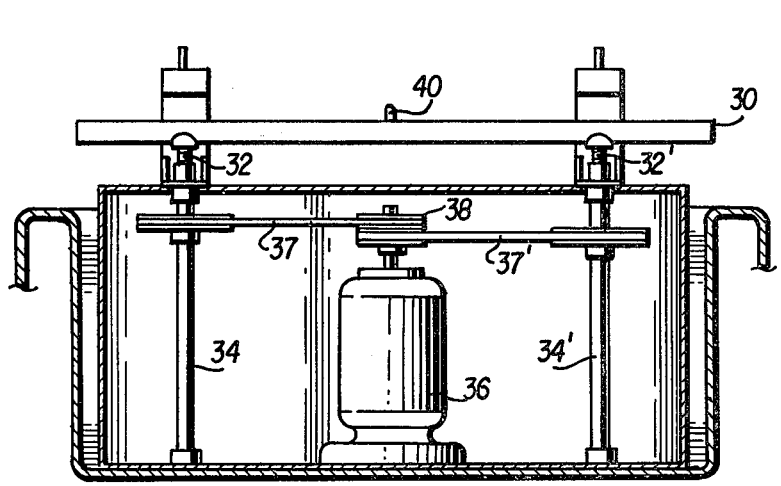
FIG. 2 is a cutaway drawing of a load-lifting assembly.

Each of the jacks, the forward jack 16 and the rear jack 18, are of substantially similar configuration and may be as shown in FIG. 2 wherein motor 36 turning drive pulley 38 through V-belt assemblies 37 and 37' engage threaded screws 32 and 32' which cause a vertical motion to occur by virtue of shaft guides 34 and 34'. The action of the threaded screw jacks acting in concert raise and lower an angle iron or V-shaped beam 30 which is attached to the threaded screws 32 and 32' in such a way that angle iron 30 moves smoothly in a vertical plane. As shown in FIG. 2, the angle iron 30 has positioned about its center a centering pin 40 which is positioned so as to engage the load as described hereinafter.

Figure 3:
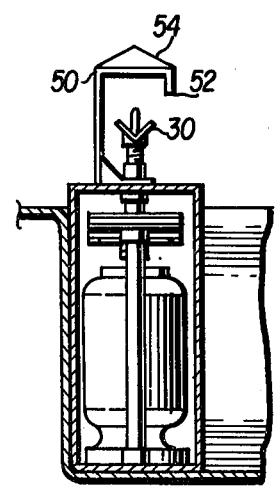
FIG. 3 is a side view of the assembly shown in FIG. 2.

FIG. 3 is a side view of that shown in FIG. 2 which more clearly shows the V-shaped beam 30 and its vertical alignment with locking box or L-shaped plate 50 which is employed to secure the rack or container assembly which will be described hereinafter to the vehicle in transit.

FIG. 4 is a side view of the vehicle approaching a rack or load-carrying device 20 supported on legs or stands 22 and 22', herein shown as a conventional welded rack assembly extending substantially the length of the cab and vehicle bed with legs positioned on both sides (not shown). The stands or legs herein shown as 22 and 22' contain V-shaped channel 26 and 26' at the jack height positioned horizontal and perpendicular to the direction of travel as shown by the arrow. The legs provide for convenient stationary storage of the load or rack when not engaged for transit. As vehicle 10 backs under and between the rack and its legs in its storage position following the direction of the arrow shown in FIG. 4, the V-shaped beam 30 of the load-lifting device 16 is positioned substantially underneath the V-shaped channel or coupling location shown as 26 in FIG. 4. At that point motor 36 may be actuated causing threaded screw jack 32 to rise lifting V-shaped beam 30, catching the rack coupling or V-shaped channel, lifting the rack uniformly and safely a predetermined distance. Locking box 50 as shown in FIG. 5 may be the stop. When the motor is engaged and the rack is being engaged by the V-shaped beam 30, FIGS. 6 and 7 demonstrate the precise centering character of the invention.

In FIG. 6 it can be seen that centering pin 40 passes through aperture 42 entering into frustum 28 which has a dimension along its base equal to the length of the aperture 42. At the same time the V-shaped beam or centering jack support 30 comes into close proximity to the V-shaped channel 26. As the centering pin 40 passes through aperture 42 the sides of frustum 28 act to guide the pin, actually moving rack 20, so that the rack is properly centered. As seen in FIG. 7, when the pin is located in the aperture which forms the smaller end of frustum 28, the proper alignment of the two V-shaped assemblies 26 and 30 is accomplished.

As can be easily seen, where the rack is not completely in alignment with the vehicle, the centering pin will shift both the lateral and longitudinal position of the rack 20 such that in every case the rack will be perfectly aligned so as to assure complete and full support during the lifting and transit operations.

When centering is complete, the jack assembly continues to lift the rack until the V-shaped channel seated in the centering jack support or V-shaped beam is stopped and fixed in the locking box 50 at which point the motor is either manually shut off or advantageously automatically shut down whereby the jack remains in place securing the assembly to the vehicle for safe and convenient transit.

Viewing FIG. 3, an L-shaped plate 50 is positioned in an inverted configuration having lip 52 depending therefrom. An optional housing or pin roof 54 is positioned above a pin aperture (not shown) in the substantial center of the base of the L-shaped plate. When the V-shaped channel and mated beam are in contact with the base of the inverted L-shaped plate, (see FIG. 5) the leg and the lip 52 lock the assembly so as to substantially prevent movement parallel to the direction of travel.

When it is desired to exchange the rack or otherwise remove it from the vehicle, the reverse operation is substantially employed. Namely, the rack is positioned over its storage location and motor 36 is reversibly engaged so that the action of the threaded screw jack causes a lowering of the rack until its legs are supporting the rack and the centering pin is clear of the V-shaped channel and its aperture. Without further effort, the vehicle may be moved leaving behind the rack or load-carrying container.

The lifting devices of this invention may be operated in any conventional manner, both automatically and manually. The manually operated lifters such as hand-turned jacks, while perhaps the most trouble free, simple, and economical, may also be the most difficult to use especially when heavy loads are employed or during inclement weather. Simple electric motors may be the most convenient for some applications, however pneumatic and hydraulic devices which are familiar may be interchangeably employed.

As can be easily seen, the lifting mechanism may be conveniently matched in pairs in order to provide simple and convenient lifting and locking. It should, however, be understood that configurations employing the load-lifting and centering device of this invention may be employed having one such unit and alternatively, more than two units may be employed where desired. In the use of lightweight or recreational vehicles, two jack assemblies mounted as discussed to simplify the original installation would thus be generally out of the way when the rack or other load container is not being used. One lifter can be conveniently mounted on the floor of the forward bed shown as 12 in FIG. 1 or at any other convenient location where adequate support and balance can be maintained, while the second is located at the bumper 14 or at any other more rearward location where support and balance can be maintained. As mentioned earlier, bumper and other connections can be reinforced where exceptionally heavy loads are anticipated.

As may be noted, locking box 50 may not be necessary for some applications and accordingly the raised jacks may be stopped at any predetermined position. However, for additional safety and stability, the L-shaped assembly may be employed. This assembly need only be a few inches above the normal height of the V-shaped channel on the rack assembly and may be fixed to the vehicle or, preferably, to the jack assembly itself.

In designing the welded or otherwise affixed rack and separate jack assembly, materials should be selected to insure strength and safety. While this type of design is within the skill of the art, in our embodiment it is expected that the pin may be about 1 inch in diameter, the slot or aperture in the V-shaped channel may be about 8 inches long and 2½ inches wide, the angle irons forming the V-shaped channel and beam having about 3 inches on a side and the larger end of the base of the frustum extending the length of the aperture and the width of the angle iron. Since the dimension of the smaller end of the frustum should be about the size of the pin, the properly seated pin should hold the mated assemblies together.

As it can be seen, this invention in at least one embodiment involves a supporting apparatus having at least one open V-shaped channel and a means for supporting said channel in a substantially horizontal mode, where there is an aperture through the apex of said channel between the terminal ends thereof. A frustum or cut cone structure open at both ends is fixed upon the channel with its larger end mounted adjacent the open V-shaped channel substantially covering the aperture. A centering pin of a dimension such that it will pass through the aperture and the smaller end of the frustum is fixed to a V-shaped beam having a configuration to substantially mate with said V-shaped channel. Means are provided for moving said V-shaped beam and said pin into mating position with said channel and said aperture respectively.

In practical application of the system of this invention, the rack or other container can be loaded at a job site, warehouse, or campsite, and can be picked up by the truck by simply backing the truck under the load rack and actuating the switch or switches employed to raise the jacking system. It should be easily seen that one switch can be used to actuate both jacks simultaneously, or alternatively tandem switching or other convenient means may be employed as is well known in the art. When the load has been completely engaged as shown in the configurations of FIG. 5, the load can be safely carried during vehicle transit and upon arrival at the terminating location. By turning again the switches in the reverse or lowering position the load may be safely deposited and the track can immediately leave for another destination. Thus it can be seen the racks can be loaded or unloaded at times that would not delay the truck or driver.

Alternatively, a vehicle which is used during the week for construction or other job related applications can be converted quickly and easily to a recreational vehicle by substituting a rack or other work-containing device with a camper or other recreational assembly and that such a conversion can be conveniently and easily made with the maximum convenience and the minimum risk to the safety of the vehicle, its passengers, and other who share the highways.

It should be apparent that the structure and method of this invention have many advantages over the standard truck or truck and trailer combination. A single truck may be used to handle a large number of containers since the truck is required only for transporting the containers and need not be kept idle while the container is being loaded or unloaded. Since the vehicle may be devoted substantially entirely to the transport service, and need not be used merely to support the container during loading and unloading or other non-transit related uses, the owner or operator of the vehicle may obtain a far greater service from his trucks and therefore can operate with far fewer trucks than had been previously possible.

It will be apparent that the term "rack" and "container" are used interchangeably herein to define any load which can be moved by a powered vehicle.

The invention has been described in terms of the use of an electric motor mounted in jacking position for raising and lowering a portion of the container or rack. However the invention also contemplates the use of other means for this purpose as heretofore mentioned. For example, screw jacks of any type may be used to elevate the container. Alternatively pneumatic, hydraulic, and other jacking devices conventionally known may be positioned as are the screw jacks previously described. Alternatively, a power takeoff from the truck itself may be employed where power is transmitted to a standard differential or through standard gear and rack, or worm and worm wheel components.

Although various embodiments of this invention have been shown and described herein, the invention is not so limited. It will be immediately apparent to those skilled in the art that many other types of containers may be used in the structure of this invention and many alternative load-lifting mechanisms can be employed. The invention should therefore be limited only in view of the appended claims.

What is claimed is:

1. A supporting apparatus comprising
   at least one open V-shaped channel;
   means for supporting said channel in a substantially horizontal mode;
   an aperture through the apex of said channel between the terminal ends thereof;
   a frustum open at both ends with its larger end mounted adjacent said open V-shaped channel substantially above said aperture;
   a centering pin of a dimension such that it will pass through said aperture and the smaller end of said frustum;
   a V-shaped beam mounted to one end of said centering pin having a configuration to substantially mate with said V-shaped channel; and
   means for supporting and moving said V-shaped beam and said pin into mating position with said channel and said aperture respectively.

2. The supporting apparatus of claim 1 wherein said means for supporting and moving comprises a lifting means attached to said V-shaped beam for raising said beam and said channel a predetermined distance.

3. The supporting apparatus of claim 1 including means for locking said channel in its uppermost position.

4. The supporting apparatus of claim 3 wherein said means for locking said channel comprises
   an inverted L-shaped plate secured to said means for supporting and moving said V-shaped channel, and
   a lip depending from the outer edge of said L-shaped plate;
   said channel being of a dimension to fit between said lip and the leg of said inverted L-shaped plate.

5. The supporting apparatus of claim 2 wherein said lifting means comprises at least one screw jack.

6. The supporting apparatus of claim 2 wherein said lifting means comprises at least one pneumatic jack.

7. The supporting apparatus of claim 2 wherein said lifting means comprises at least one hydraulic jack.

8. The supporting apparatus of claim 4 wherein said inverted L-shaped plate comprises an aperture having a dimension such that it will receive said centering pin.

9. The supporting apparatus of claim 3 whereby said means for locking is attached to said means for supporting and moving.

10. The supporting apparatus of claim 4 whereby said leg of said L-shaped plate is attached to said means for supporting and moving said V-shaped beam.

* * * * *